US009315590B2

(12) United States Patent
Cortial et al.

(10) Patent No.: US 9,315,590 B2
(45) Date of Patent: *Apr. 19, 2016

(54) CATALYTIC SYSTEM FOR CONJUGATED DIENE POLYMERISATION, POLYMERISATION METHOD AND FUNCTIONAL POLYMER OBTAINED

(71) Applicants:COMPAGNIE GENERALE DES ETABLISSEMENTS MICHELIN, Clermont-Ferrand (FR); MICHELIN RECHERCHE ET TECHNIQUE S.A., Granges-Paccot (CH); CENTRE NATIONAL DE LA RECHERCHE SCIENTIFIQUE, Paris (FR); ECOLE POLYTECHNIQUE, Palaiseau (FR)

(72) Inventors: Guillaume Cortial, Clermont-Ferrand (FR); Pascal Le Floch, Orsay (FR); Francois Nief, Antony (FR); Julien Thuilliez, La Roche Blanche (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH); CENTRE NATIONAL DE LA RECHERCHE SCIENTIFIQUE, Paris (FR); ECOLE POLYTECHNIQUE, Palaiseau (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,446

(22) Filed: Dec. 10, 2012

(65) Prior Publication Data

US 2013/0274407 A1 Oct. 17, 2013

Related U.S. Application Data

(63) Continuation of application No. 13/375,745, filed as application No. PCT/EP2010/003306 on Jun. 1, 2010, now abandoned.

(30) Foreign Application Priority Data

Jun. 2, 2009 (FR) ..................................... 09 02650

(51) Int. Cl.
*C08F 4/50* (2006.01)
*C08F 4/52* (2006.01)
*C08F 4/46* (2006.01)
*C08L 15/00* (2006.01)
*C08F 236/08* (2006.01)
*C08F 236/06* (2006.01)

(52) U.S. Cl.
CPC . *C08F 4/50* (2013.01); *C08F 4/463* (2013.01); *C08F 4/52* (2013.01); *C08L 15/00* (2013.01); *C08F 236/06* (2013.01); *C08F 236/08* (2013.01)

(58) Field of Classification Search
CPC ............ C08F 4/50; C08F 4/52; C08F 236/00; C08F 236/06; C08F 236/08
USPC .......... 502/103, 104; 526/164, 165, 337, 335; 525/331.9, 333.2
See application file for complete search history.

(56) References Cited

U.S. PATENT DOCUMENTS

| 4,057,565 A | * | 11/1977 | Manzer | 534/15 |
|---|---|---|---|---|
| 4,550,142 A | | 10/1985 | Akita et al. | |
| 5,066,721 A | | 11/1991 | Hamada et al. | |
| 5,238,893 A | * | 8/1993 | Hergenrother | B60C 1/00 260/665 R |
| 5,274,106 A | * | 12/1993 | Lawson | B60C 1/0016 502/155 |
| 5,496,940 A | * | 3/1996 | Lawson | C07F 1/02 540/450 |
| 5,502,131 A | * | 3/1996 | Antkowiak et al. | 526/180 |
| 5,519,086 A | * | 5/1996 | Lawson | B60C 1/0016 524/571 |
| 5,527,753 A | * | 6/1996 | Engel | C08F 12/04 502/155 |
| 5,665,812 A | | 9/1997 | Gorce et al. | |
| 5,935,893 A | * | 8/1999 | Lawson | C07F 1/02 502/155 |
| 5,955,531 A | * | 9/1999 | Futamura | B60C 1/00 152/524 |
| 6,013,718 A | | 1/2000 | Cabioch et al. | |
| 6,610,859 B1 | * | 8/2003 | Brockmann | C07F 1/02 548/490 |
| 6,838,534 B2 | | 1/2005 | Laubry | |

(Continued)

FOREIGN PATENT DOCUMENTS

| EP | 0 551 628 A1 | 12/1992 |
|---|---|---|
| EP | 0 692 492 A1 | 1/1996 |
| EP | 0 692 493 A1 | 1/1996 |
| EP | 0 778 311 A1 | 6/1997 |

(Continued)

OTHER PUBLICATIONS

International Search Report (PCT/ISA/210) issued on Sep. 24, 2010, by European Patent Office as the International Searching Authority for International Application No. PCTEP2010/003306.

*Primary Examiner* — Rip A Lee
(74) *Attorney, Agent, or Firm* — Dickinson Wright PLLC

(57) ABSTRACT

The present invention relates to a novel catalytic system for polymerization, and more particularly for preparing conjugated diene polymers bearing a polar function at the chain end. This catalytic system is based on a metal salt of a rare-earth metal and, as alkylating agent, an organometallic compound based on a metal belonging to the $2^{nd}$ column or the $13^{th}$ column of the Periodic Table, capable of transferring a polar function to the diene elastomer during the conjugated diene polymerization step. The novel catalytic system makes it possible to reduce the steps for synthesizing a chain-end functionalized elastomer, while ensuring optimal functionalization, advantageously close or equal to 100%.

17 Claims, No Drawings

(56) References Cited

U.S. PATENT DOCUMENTS

| | | | |
|---|---|---|---|
| 6,943,250 B2 * | 9/2005 | Brockmann | C07F 1/02 544/229 |
| 7,056,998 B2 | 6/2006 | Laubry et al. | |
| 8,507,397 B2 * | 8/2013 | Cortial et al. | 502/154 |
| 2005/0090383 A1 * | 4/2005 | Thiele | C08F 36/04 502/152 |
| 2006/0149006 A1 * | 7/2006 | Koehler et al. | 526/124.3 |
| 2011/0009583 A1 * | 1/2011 | Yan | C08C 19/44 526/204 |
| 2013/0274407 A1 * | 10/2013 | Cortial et al. | 524/571 |

FOREIGN PATENT DOCUMENTS

| | | |
|---|---|---|
| EP | 1 355 960 A1 | 10/2003 |
| EP | 1 509 557 A1 | 3/2005 |
| WO | WO 02/38636 A1 | 5/2002 |
| WO | WO 03/033545 A2 | 4/2003 |
| WO | WO 03/097708 A1 | 11/2003 |
| WO | WO 2004/055064 A1 | 7/2004 |
| WO | WO 2004/074333 A2 | 9/2004 |

* cited by examiner

CATALYTIC SYSTEM FOR CONJUGATED DIENE POLYMERISATION, POLYMERISATION METHOD AND FUNCTIONAL POLYMER OBTAINED

This application is a continuation of U.S. Ser. No. 13/375,745, now abandoned, which is a 371 national phase entry of PCT/EP2010/003306, filed Jun. 1, 2010, which itself claims priority to FR 0902650, filed Jun. 2, 2009.

The present invention relates to a novel catalytic system based on a rare earth, to a process for preparing this catalytic system, to a process for preparing a functionalized conjugated diene polymer that consists in using said catalytic system, and to such a polymer. The invention also relates to a novel organometallic compound based on a divalent metal belonging to the $2^{nd}$ column of the Periodic Table used as a co-catalyst in the catalytic system based on a rare earth and to the process for preparing same.

Now that savings in fuel and the need to protect the environment have become a priority, it is desirable to produce mixtures having good mechanical properties and a hysteresis which is as low as possible in order to be able to employ them in the form of rubber compositions which can be used in the manufacture of various semi-finished products incorporated into the composition of tyres, such as, for example, underlayers, sidewalls or treads, and in order to obtain tyres having an increasingly reduced rolling resistance. In order to achieve such an objective, it has been proposed to modify the structure of the diene polymers and copolymers at the end of polymerization by means of functionalizing, coupling or star-branching agents in order to introduce into the elastomer an interactive function with respect to the filler (or fillers) used in the rubber composition.

A very large majority of these solutions firstly concentrated on the use of functionalized polymers that are active with respect to carbon black, for the purpose of obtaining a good interaction between the polymer thus modified and the carbon black.

More recently, modified elastomers that are active with respect to silica have been developed for the purpose of obtaining a good interaction between the polymer thus modified and the silica.

When the diene elastomers are obtained by polymerization of the monomers in the presence of a catalytic system based on a rare earth, as described in particular in patent documents EP 1 355 960 A1 or EP 1 509 557 B1 by the applicants, it is possible to envisage a functionalization with agents bearing a function suitable for the application envisaged for the functionalized diene elastomer.

As a functionalizing agent that can be used for this functionalizing step, it is possible to envisage those used in the prior art for functionalizing diene elastomers resulting from the anionic polymerization in the presence of a catalyst based on an organic compound of an alkali metal.

By way of illustration of this prior art relating to the interaction with carbon black, mention may be made, for example, of the chain-end modification of diene elastomers by agents such as 4,4'-bis(diethylamino)benzophenone as described in patent document U.S. Pat. No. 4,550,142 or halogenated derivatives of tin, or else the grafting along the polymer chain of functions active with respect to carbon black.

By way of illustration of this prior art relating to the interaction with silica, mention may be made, for example, of the U.S. Pat. No. 5,066,21, which describes a rubber composition comprising a diene polymer functionalized by an alkoxysilane having at least one unhydrolysed alkoxy residue. In patent documents EP 0 692 492 A1 and EP 0 692 493 A1, in the name of the applicants, the functionalization of diene elastomers by an alkoxysilane group, using a functional agent such as an epoxidized alcoxysilane, is described. Document EP 0 778 311 A1 discloses diene polymers bearing, at the chain end, a silanol function or a polysiloxane block having a silanol end that are obtained by reaction, at the end of polymerization, of cyclic polysiloxanes with the living polymers.

The method for synthesizing functionalized polymers using a catalytic system based on a rare earth has the advantage of resulting in diene elastomers possessing chemical functions at the chain end of varied structure, depending on the choice of the functional agent used. However, one drawback is that the synthesis comprises several steps, which may result in a higher cost during the manufacture of such a polymer on the industrial scale, for example linked to the use of a larger number of reactors and therefore to a complicated implementation.

Another drawback is the control of the purity of the functionalizing agent, which depending on the case, may result in deactivation or termination reactions of the ends of the growing polymer chains, the cause of a higher or lower proportion of unfunctionalized elastomer chains.

The present invention proposes to overcome the above drawbacks by using a limited number of reaction steps and by resulting in an optimal proportion of functionalized chains.

During their research, the inventors have discovered a novel catalytic system based on a rare-earth metal salt comprising, as co-catalyst, an organometallic compound based on a divalent metal belonging to the $2^{nd}$ column of the Periodic Table or a trivalent metal belonging to the $13^{th}$ column of the Periodic Table, which makes it possible to limit the number of steps for synthesizing a chain-end functionalized diene elastomer, while ensuring an optimal functionalization, i.e. close or equal to 100%.

The use of this catalytic system for polymerization, more particularly for preparing functionalized diene elastomers, makes it possible to do away with the subsequent step of reacting with a functionalizing agent. The functionalized diene elastomers thus obtained have a high level of functionalization, up to 100%, and may advantageously be used in rubber compositions comprising a reinforcing filler and intended for a tyre application.

A first subject of the present invention is therefore a catalytic system based on a rare-earth metal salt and an organometallic compound based on a metal belonging to the $2^{nd}$ or $13^{th}$ column of the Periodic Table.

Another subject of the invention is a process for preparing said catalytic system based on a rare-earth metal salt.

A subject of the invention is also a process for preparing a functionalized diene elastomer by polymerization of at least one conjugated diene monomer in the presence of said catalytic system based on a rare-earth metal salt.

Another subject of the invention is a functionalized diene elastomer capable of being obtained by polymerization of at least one conjugated diene monomer in the presence of said catalytic system based on a rare-earth metal salt.

A subject of the invention is also a family of novel compounds capable of being used as a co-catalyst in said catalytic system based on a rare-earth metal salt.

A subject of the invention is also a process for preparing these novel compounds.

Of course, the expression "based on" used to define the constituents of the catalytic system is understood to mean the mixture of these constituents and/or the product of the reaction between these constituents. Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b). In addition, the expression "functionalized polymer" is understood to mean a polymer bearing a functional group at the chain end.

Thus, a first subject of the present invention is a catalytic system based on a rare-earth metal salt and an organometallic compound based on a metal belonging to the $2^{nd}$ or $13^{th}$ column of the Periodic Table, the latter compound corresponding to the formula (I):

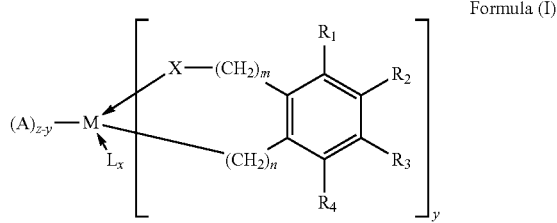

Formula (I)

in which:

M is a metal belonging to the $2^{nd}$ or $13^{th}$ column of the Periodic Table;

$R_1$, $R_2$, $R_3$, $R_4$, which are identical to or different from one another, are hydrogen atoms or linear or branched alkyl or substituted or unsubstituted aryl substituents, optionally bonded together ($R_i$ is then bonded to $R_{i+1}$) to form at least one ring composed of 5 or 6 atoms, or at least one aromatic ring;

A is an alkyl radical based on C, H or Si atoms;

X is a chemical function bonded to $(CH_2)_m$ by a heteroatom;

L is a Lewis base;

x is an integer that is equal to 0, 1, 2, 3 or 4;

n and m, independently of one another, are each an integer greater than or equal to 0, on condition that n and m are not both equal to 0;

z is equal to 2 when M belongs to the $2^{nd}$ column and is equal to 3 when M belongs to the $13^{th}$ column; and y is a non-zero integer ranging from 1 to z.

In this formula (I), M is preferably magnesium or aluminium.

When $R_1$, $R_2$, $R_3$ or $R_4$ denotes an alkyl substituent, this is preferably a $C_1$-$C_{12}$, and more preferably still $C_1$-$C_6$, alkyl substituent.

When $R_1$, $R_2$, $R_3$ or $R_4$ denotes an aryl substituent, this is preferably a $C_6$-$C_{12}$, and more preferably still $C_6$-$C_{10}$, aryl substituent.

When $R_1$, $R_2$, $R_3$ or $R_4$ are bonded together to form one or more rings containing 5 or 6 carbon atoms, the unit obtained is preferably composed of 2 to 4 conjugated aromatic rings, and more preferably of 2 to 3 aromatic rings.

Preferably $R_1$, $R_2$, $R_3$ and $R_4$ are hydrogen atoms.

In this formula (I), A is more particularly a radical comprising 1 to 8 carbon atoms, preferably 2 to 8 carbon atoms. Preferably, A is an ethyl, n-butyl, i-butyl, n-hexyl, n-octyl, —$CH_2$—$Si(CH_3)_3$ or —$CH$—$[Si(CH_3)_3]_2$ radical.

In this formula (I), X is preferably chosen from —OR groups and —NRR' groups with R, R' denoting linear or branched alkyl or substituted or unsubstituted aromatic substituents that are identical to or different from one another.

When R or R' denotes an alkyl substituent, this is preferably a $C_1$-$C_6$, and more preferably still $C_1$-$C_4$, alkyl substituent.

When R or R' denotes an aryl substituent, this is preferably a $C_6$-$C_{12}$, and more preferably still $C_5$-$C_6$, aryl substituent.

Preferably R and R' are methyl, ethyl, isopropyl, n-butyl, isobutyl or tert-butyl groups.

In the formula (I), n is an integer greater than or equal to 0, preferably greater than or equal to 1 and less than 3, more particularly equal to 1, m is an integer greater than or equal to 0, preferably greater than or equal to 0 and less than 3, more preferably equal to 0 or 1, m is more preferably equal to 1.

In the formula (I), y is a non-zero integer ranging from 1 to z, y is preferably equal to 2 or 3.

In the formula (I), L is a Lewis base. According to the invention, the Lewis base is particularly chosen from amines or ethers. Preferably, the Lewis base is pyridine or tetrahydrofuran (THF).

The compound according to the invention corresponding to the formula (I) may furthermore be in the form of an aggregate of aluminium salts of similar composition.

A description of organometallic compounds of formula (I), and also of their preparation process, may be found in the scientific literature and especially in Marcel Schreuder Groetheijt et al., *Journal of Organometallic Chemistry*, 1997, 1-5, 527 or Peter R. Markies et al., *Journal of Organometallic Chemistry*, 1991, 289-312, 402.

These compounds of formula (I) act as alkylating agents in the catalytic systems based on a rare-earth metal salt according to the invention.

The preferred compounds according to the invention are those of formula (I) based on an element from the $2^{nd}$ column of the Periodic Table. The compounds of formula (I) in which M denotes magnesium and y is equal to 2 are particularly preferred. Among these, mention may be made, for example, of di(ortho-N,N'-alkylaminoalkylbenzyl)magnesium and bis(ortho-methoxybenzyl)magnesium.

Another constituent element of the catalytic system according to the invention is the salt of a rare-earth metal. The expression "rare-earth metal" is understood according to the invention to mean any element from the family of lanthanides, or yttrium or scandium. Preferably, the rare-earth element is chosen from the elements yttrium, neodymium, gadolinium or samarium, more preferably neodymium or gadolinium.

The rare-earth metal salt, according to the invention, may be represented by the formula $Ln(A')_3(B)_n$, in which Ln is the rare-earth element, A' is chosen from halides, carboxylates, organophosphates, alcoholates, amides, alkyls or borohydrides and B is one or more solvent molecules complexed to the rare-earth metal and n is an integer between 0 and 3.

In the definition of B, the expression "complexed solvent" is understood in particular to mean ethers, amines, phosphates and thioethers. For example as an amine, mention may be made of the family of trialkylamines and aromatic amines such as pyridine or else piperazine and its derivatives. As a phosphate, mention may be made, for example, of tri-n-butyl phosphate. As a thioether, mention may be made of the family of dialkyl sulphides such as dimethyl sulphide. As an ether, mention may be made, for example of diethyl ether, 1,2-diethoxyethane, 1,2-di-n-propoxyethane, 1,2-di-n-butoxyethane, tetrahydrofuran, dioxane and tetrahydropyran. More particularly B is an ether, preferably tetrahydrofuran (THF).

When A' is a halide, it is preferably a chloride. B is then preferably a molecule of THF and n is equal to 2.

When A' is a carboxylate, this is chosen from esters of linear or branched aliphatic carboxylic acids having 6 to 16 carbon atoms in the linear chain, and esters of substituted or unsubstituted aromatic carboxylic acids having between 6 and 12 carbon atoms. By way of example, mention may be made of the linear or branched neodecanoate (versatate), octoate or hexanoate, or else the substituted or unsubstituted naphthenate. Among the family of carboxylates, A' is preferably the rare-earth 2-ethylhexanoate, naphthenate or neodecanoate.

When A' is chosen from organophosphates, this includes the phosphoric acid diesters of general formula (R'O)(R"O)PO(OH), in which R' and R", which are identical or different, represent an alkyl, aryl or alkylaryl radical. Among these phosphoric acid diesters, R' and R", which are identical or different, are preferably an n-butyl, isobutyl, pentyl, amyl, isopentyl, 2,2-dimethylhexyl, 1-ethylhexyl, 2-ethylhexyl, tolyl or nonaphenoxyl radical. Among the family of organophosphates, the salt is more preferably still the rare-earth bis(2-ethylhexyl)phosphate.

When A' is chosen from alcoholates, the alcoholates of an alcohol or of a polyol derived from an aliphatic or cyclic hydrocarbon and in particular from a linear or branched aliphatic hydrocarbon having 1 to 10 carbon atoms in the linear chain, more particularly 4 to 8 carbon atoms, are included. Mention may be made, for example, of neopentanolate.

When A' is chosen from the family of amides, this includes, in particular, dialkylamides, N,N-bis(dialkylsilyl)amides and N,N-bis(trialkylsilyl)amides, the alkyl groups having between 1 and 5 carbon atoms.

When A' is chosen from dialkylamides, B is preferably THF and n is preferably equal to 1. A' is then preferably diisopropylamide and dimethylamide.

When A' is chosen from N,N-bis(trialkylsilyl)amides, n is preferably equal to 0. A' is then preferably the N,N-bis(trimethylsilyl)amide of formula —N[Si(CH$_3$)$_3$].

When A' is chosen from N,N-bis(dialkylsilyl)amides, B is preferably THF and n is preferably equal to 2 or 3. A' is then preferably the N,N-bis(dimethylsilyl)amide of formula —N[SiH—(CH$_3$)$_2$].

When A' is chosen from the family of alkyls, A' is preferably a (trialkylsilyl)alkyl, such as (trimethylsilyl)methyl or bis(trimethylsilyl)methyl.

When A' is chosen from the borohydrides, A' is preferably tetrahydroborate, B is preferably THF and n is preferably equal to 2 or 3.

According to one preferred aspect of the invention, the rare-earth metal salt is chosen from rare-earth organophosphates, amides, alkyls or borohydrides. More particularly, the rare-earth metal salt is chosen from a rare-earth tris[di(2-ethylhexyl)phosphate], a rare-earth tri[N,N-bis(trimethylsilyl)amide] or a rare-earth tris(borohydride).

According to one aspect of the invention, the rare-earth metal salt may be a salt of a mixture of rare-earth metals or else a mixture of several salts of one or more rare-earth metals.

According to one embodiment of the invention, the catalytic system may comprise at least one additional compound of alkylaluminium or alkylaluminium halide type, then acting as an alkylating agent and/or as halogen donors. Among these compounds, mention may be made of:
  trialkylaluminiums, the alkyl radical being a $C_2$-$C_8$ alkyl radical, for example triethylaluminium, triisobutylaluminium, or trioctylaluminium;
  dialkylaluminium hydrides, the alkyl radical being a $C_2$-$C_4$ alkyl radical, for example diisobutylaluminium hydride;
  alkylaluminium halides, the alkyl radical being a $C_2$-$C_4$ alkyl radical and the halogen being chlorine or bromine, for example diethylaluminium chloride, diethylaluminium bromide, ethylaluminium dichloride or ethylaluminium sesquichloride.

When it is combined with a catalytic system comprising an organometallic compound of formula (I) and where the metal is magnesium, it will be noted that this agent of alkylaluminium type preferably consists of diisobutylaluminium hydride or triisobutylaluminium hydride.

When it is combined with a catalytic system comprising an organometallic compound of formula (II), it will be noted that this alkylating agent is preferably a mixture consisting of an alkylaluminium and of an alkylaluminium halide, for example diisobutylaluminium hydride or triisobutylaluminium hydride and diethylaluminium chloride.

According to another embodiment of the invention, the catalytic system according to the invention may also comprise a preforming conjugated diene. As a preforming conjugated diene that can be used to preform the catalytic system according to the invention, mention may be made of 2-methyl-1,3-butadiene (or isoprene), 2,3-di($C_1$ to $C_5$ alkyl)-1,3-butadiene such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, or any other conjugated diene having between 4 and 8 carbon atoms, 1,3-butadiene preferably being used.

Another embodiment of the invention consists of the combination of these two embodiments.

Preferably, in the catalytic system according to the invention, the (organometallic compound of formula (I)/rare-earth metal) molar ratio may have a value ranging from 1.5 to 20 (limits included), more preferably from 2 to 12.

Preferably, when the catalytic system according to the invention comprises an additional compound of alkylaluminium type as defined above, the (alkylating agent/rare-earth metal) molar ratio may have a value ranging from 2 to 20 (limits included), more preferably from 2 to 6.

Also preferably, when the catalytic system according to the invention comprises an additional compound of halogen donor type defined above, in the catalytic system according to the invention, the (halogen/rare-earth metal) molar ratio may have a value ranging from 2 to 3.5, in order to observe a satisfactory catalytic activity, more preferably from 2.6 to 3.

Also preferably, when the catalytic system according to the invention comprises a preforming conjugated diene the (preforming conjugated diene/rare-earth metal) molar ratio may have a value ranging from 10 to 70, in order to observe a better catalytic activity and a reduced molecular weight distribution, more preferably from 30 to 70.

According to another preferred feature, the catalytic system according to the invention comprises a rare-earth metal concentration greater than or equal to 0.002 mol/l and preferably ranging from 0.010 mol/l to 0.1 mol/l and more advantageously ranging from 0.015 to 0.06 mol/l.

Another subject of the invention is a process for preparing the catalytic system described above.

According to a first preferred embodiment of the process in accordance with the invention in which the catalytic system is specifically preformed prior to any use, various catalytic constituents, including the preforming conjugated diene, are brought into contact, in an inert hydrocarbon-based solvent for a duration of between 0 and 30 minutes at a temperature optionally above ambient temperature, generally between 10° C. and 80° C., followed by an ageing of the catalytic constituents, in the presence of said preforming conjugated diene.

Mention may be made, as an inert hydrocarbon-based solvent, of for example an aromatic solvent such as toluene, or else an aliphatic or alicyclic solvent such as pentanes, n-pentane, isopentane, a mixture of hexanes, n-hexane, cyclohexane, methylcyclohexane, a mixture of heptanes or n-heptane.

According to a second embodiment of the process in accordance with the invention, said catalytic system is advantageously prepared by forming a premix over 0 to 30 minutes at a temperature ranging from 10° C. to 80° C., by introducing into an inert hydrocarbon-based solvent as defined above, the compound of formula (I) and optionally the alkylating agent and/or the halogenating agent, then by adding the rare-earth metal salt to this premix.

According to a third embodiment of the process in accordance with the invention, the catalytic system is specifically formed in situ, that is to say that all the catalytic constituents, the solvent, the rare-earth metal salt, the compound of formula (I), the monomer to be polymerized and optionally the alkylating agent and/or the halogenating agent, are introduced into the reactor, in any order, just before polymerization.

Another subject of the invention is a process for preparing a functionalized diene elastomer by polymerization of at least one conjugated diene monomer in the presence of said catalytic system based on a metal salt of rare earth(s).

According to one feature of the invention, said polymerization reaction may be carried out at a temperature preferably ranging from 0 to 100° C., in an inert hydrocarbon-based polymerization solvent, such as pentane, n-pentane, isopentane, a mixture of hexanes, n-hexane, cyclohexane, methylcyclohexane, a mixture of heptanes or n-heptane, or else in bulk.

According to one advantageous feature of the process of the invention carried out in a solvent, the solvent/monomer(s) weight ratio before the polymerization reaction advantageously has a value ranging from 1 to 10 and preferably from 4 to 7. The polymerization process could be carried out according to a continuous process or a batch mode process.

According to another advantageous feature of the process according to the invention, said catalytic system is present in the reaction medium at a concentration between 5 and 5000 μmol per 100 g of monomer to be polymerized, preferably between 50 and 500 μmol per 100 g of monomer to be polymerized.

As diene elastomer that may be prepared by the process according to the invention, mention may be made of any homopolymer or copolymer obtained by homopolymerization or copolymerization of at least one conjugated diene monomer having from 4 to 12 carbon atoms, optionally with a vinylaromatic compound.

Suitable conjugated diene monomer(s) is (are) in particular 1,3-butadiene, isoprene, 2,3-di($C_1$ to $C_5$ alkyl)-1,3-butadienes, such as for example, 2,3-dimethyl-1,3-butadiene, 2,3-diethyl-1,3-butadiene, 2-methyl-3-ethyl-1,3-butadiene, and 2-methyl-3-isopropyl-1,3-butadiene, an aryl-1,3-butadiene, 1,3-pentadiene, and 2,4-hexadiene.

Suitable vinylaromatic compounds are for example: styrene, ortho-, meta-, para-methylstyrene, the commercial "vinyl-toluene" mixture, para-tert-butylstyrene, methoxystyrenes, chlorostyrenes, vinylmesitylene, divinylbenzene, and vinylnaphthalene.

The copolymers may contain between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and they can be coupled and/or star-branched with a coupling and/or star-branching agent.

Particularly preferably, said diene elastomer is selected from the group of highly unsaturated diene elastomers consisting of polybutadienes (BR) and synthetic polyisoprenes (IR).

It will be noted that the catalytic system used in the process according to the invention especially makes it possible to obtain diene elastomers functionalized at the chain end by a polar aromatic function, originating from the organometallic compound of formula (I), without having to involve an additional step of reacting with a functionalizing agent. Moreover, the degree of functionalization of the diene elastomer is high. It may reach values ranging from 75% to 100%, preferably from 90% to 100%, and even substantially equal to 100%.

It will be noted that the catalytic systems used in the process according to the invention advantageously make it possible to obtain conjugated diene polymers, for example polybutadiene, having a polydispersity index with a value ranging from 1 to 3. More particularly, the catalytic systems used in the process according to the invention advantageously make it possible to obtain homopolymers of butadiene having both a polydispersity index with a value ranging from 1 to 2.5, preferably a polydispersity index with a value ranging from 1 to 1.5 (measured by the size exclusion chromatography (SEC) technique, see the appended annex 2), and a high degree of functionalization that may reach values ranging from 75%, or even from 90%, to 100%, and even substantially equal to 100%.

The functionalized diene elastomers obtained by polymerization of at least one conjugated diene in the presence of a catalytic system according to the invention are also the subject of the invention. Among these, the subject of the invention is more particularly the functionalized diene elastomers bearing, at the chain end, a polar aromatic function.

These elastomers are characterized in that they comprise, at least one chain end, a polar function originating from the organometallic compound of formula (I), which can be represented by the formula (II):

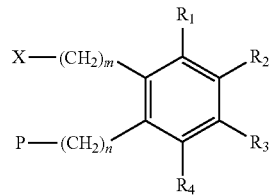

Formula II in which:
P represents the diene elastomer;
$R_2$, $R_3$, $R_4$, n, m and X being as defined above in formula (I).

According to one preferred aspect of the invention, 75% to 100% of the elastomer chains are functionalized at the chain end, more preferably still 90% to 100%, or even substantially 100%, of the elastomer chains are functionalized.

The functionalized diene elastomers in accordance with the invention may advantageously be used in reinforced rubber compositions in which they improve the hysteresis properties by promoting an interaction with respect to the filler. The functional group may be judiciously chosen depending on the type of reinforcing filler used. Such rubber compositions are then particularly suitable for an application as a tyre for a motor vehicle with a view to reducing the rolling resistance.

Such reinforced rubber compositions are also the subject of the invention. These rubber compositions comprise at least one functionalized diene elastomer obtained by polymerization of at least one conjugated diene in the presence of the catalytic system according to the invention. This elastomer may optionally be used as a blend with at least one or more elastomers conventionally used in rubber compositions for tyres and chosen from natural rubber, optionally coupled and/or star-branched and/or else partially or completely functionalized synthetic diene elastomers, synthetic elastomers other than synthetic diene elastomers, or even polymers other than elastomers.

The reinforcing filler present in the rubber composition is chosen from inorganic fillers, such as silica, organic fillers, such as carbon black, or mixtures of these fillers. These compositions may also comprise various additives usually present in rubber compositions especially intended for tyres for motor vehicles. Mention will be made, for example, of gum/filler tie agents, non-reinforcing fillers, various processing aids or other stabilizers, plasticizers, pigments, antioxidants, anti-fatigue agents, anti-ozone waxes, adhesion promoters, reinforcing resins or plasticizing resins, a crosslinking system based either on sulphur and/or on peroxide and/or on bismaleimides, crosslinking activators comprising zinc monoxide and stearic acid, guanidine derivatives, extender oils, one or more silica-covering agents.

The aforementioned features of the present invention, and other features also, will be better understood on reading the following description of several exemplary embodiments of the invention, given by way of illustration and non-limitingly in relation to the appended annexes.

EXAMPLES

All of the organometallic syntheses were carried out under an inert argon atmosphere using either Schlenk techniques or a glovebox. All the solvents used during these syntheses are dried according to conventional techniques (distillation over sodium or over a molecular sieve) and are kept under an inert atmosphere. For example, the pentane and the THF are freshly distilled over sodium/benzophenone. All of the reactants come from Sigma-Aldrich, Acros Organics, Strem and Fluka.

Syntheses

Synthesis of the Lanthanide Salts

Nd(BH$_4$)$_3$(THF)$_3$ was prepared according to a procedure described in the literature: S. Cendrowski-Guillaume, M. Nierlich, M. Lance, M. Ephritikhine, *Organometallics,* 1998, 17, 786.

Syntheses of Potassium Salts of Toluene Derivatives

Synthesis of ortho-dimethylaminobenzyl potassium [K—CH$_2$C$_6$H$_4$-o-NMe$_2$)$_3$]

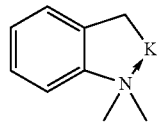

13.4 g of ortho-dimethylaminotoluene (or N,N-dimethyl-o-toluidine) (M=135 g·mol$^{-1}$; 99 mmol) are diluted in a mixture of 40 ml of hexanes and 20 ml of diethyl ether. At ambient temperature, under nitrogen and with stirring, 40 ml of a solution of butyllithium (2.5M in hexane) are added. After 3 h, 1 equivalent of $^t$BuOK is added in fractions, under argon. The solution is heated and a yellow precipitate appears. The stirring is maintained overnight. The solution is filtered and the yellow precipitate is washed three times with a mixture of hexanes (3×40 ml). After drying under vacuum, the solid is milled and dried again under vacuum overnight. 14.9 g of yellow powder of ortho-dimethylaminobenzyl potassium are obtained (yield=80%). $^1$H NMR (THF-d$^8$, 22° C.): δ=2.03 and 2.57 (2×1H, s, KCH$_2$—), 2.67 (s, 6H, —NMe$_2$), 5.11 (t, 1H, J$_{H-H}$=7 Hz, aromatic CH), 6.04 (d, 1H, J$_{H-H}$=7 Hz, aromatic CH), 6.16 (t, 1H, J$_{H-H}$=7 Hz, aromatic CH), 6.26 (t, 1H, J$_{H-H}$=7 Hz, aromatic CH).

Synthesis of ortho-methoxybenzyl Potassium

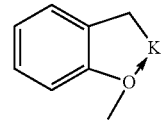

A procedure similar to that used for the synthesis of ortho-dimethylaminobenzyl potassium was used, with 12.4 ml of 2-methylanisole (100 mmol) and 41 ml of BuLi (2.5M). 13.5 g of yellow powder of ortho-methoxybenzyl potassium are obtained (yield=84%). $^1$H NMR (THF-d$^8$, 22° C.): δ=1.97; 2.20 (2×1H, s, KCH$_2$—), 3.61 (s, 3H, —OMe), 4.8 (m, 1H, aromatic CH), 5.87 (d, 1H, aromatic CH), 5.99 (t, 1H, aromatic CH), 6.00 (t, 1H, aromatic CH).

Syntheses of Functionalized Co-Catalysts Based on Magnesium

Synthesis of bis(ortho-N,N-dimethylaminobenzyl) magnesium

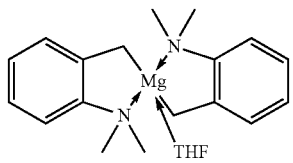

Under argon, 0.20 g of MgCl$_2$ (2.1 mmol) and 0.70 g of ortho-N,N-dimethylaminobenzyl potassium (4.0 mmol) are introduced into a Schlenk flask. Around 25 ml of THF are recondensed under vacuum at −78° C. The mixture is stirred at ambient temperature for 30 minutes, then heated at reflux under static vacuum for 5 h, at 50° C. The insoluble MgCl$_2$ crystals have then disappeared. After 1 night at 50° C., the mixture is centrifuged; the white-grey centrifugation pellet of KCl is removed, and the orange solution is concentrated to 1-2 ml, then around 0.5 ml of petroleum ether is added. Colourless crystals appear in the red solution. XRD analysis (Annex 4) of one of the crystals indicates a monomeric structure of the bis(ortho-N,N-dimethylaminobenzyl) magnesium complex (THF). M=0.30 g (yield=42%). $^1$H NMR (THF-d8, 22° C.): δ=7.00 (d, 2H, CH(6), J$_{(C-H)}$=7 Hz), 6.90 (d, 2H, CH(3), J$_{(C-H)}$=7 Hz), 6.75 (t, 2H, CH(4), J$_{(C-H)}$=7 Hz), 6.55 (t, 2H, CH(5), J$_{(C-H)}$=7 Hz), 3.65 (t, 4H, free non-deuterated THF), 2.65 (s, 12H, C(8) and C(9), N(CH$_3$)$_2$), 1.80 (m, 4H, free non-deuterated THF), 1.17 (s, 4H, C(1), Mg—CH$_2$—).

$^{13}$C NMR (THF-d8): δ=152.8 (C(2)), 148.4 (C(7)), 128.9 (C(6)), 125.9 (C(4)), 118.9 (C(5)), 118.4 (C(3)), 45.7 (N(CH$_3$)$_2$), 19.0 (Mg—CH$_2$—).

Synthesis of bis(ortho-methoxybenzyl) magnesium

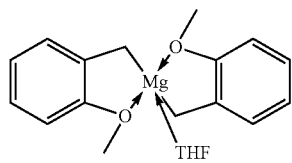

A procedure similar to that used for the bis(ortho-N,N-dimethylaminobenzyl) magnesium (THF) was used, with 0.50 g of MgCl$_2$ (5.3 mmol) and 0.84 g of ortho-methoxybenzyl potassium (5.2 mmol). 0.35 g of powder of bis(ortho-methoxybenzyl) magnesium (THF) (yield=40%) were obtained. The product was not able to be isolated in the single-crystal form.

Polymerizations

Procedure

A "Steinie" bottle, previously washed and dried, and equipped with a cap and with an airtight and leaktight seal is used as a polymerization reactor. The butadiene polymerization reactions are carried out at a temperature between 50° C. and 60° C. and under an inert atmosphere (nitrogen).

For each polymerization, methylcyclohexane is introduced into said bottle as the polymerization solvent. This methylcyclohexane is sparged with nitrogen for 10 minutes to eliminate the volatile impurities.

A "polymerization solvent (methylcyclohexane)/monomer (butadiene)" weight ratio of between 5 and 7 is used (this weight ratio is referred to as S/M hereinbelow).

The neodymium-based precursor, that is to say neodymium tris(borohydride), and the functional co-catalyst are air-sensitive compounds. For this reason, they are introduced by means of sealed glass ampoules, which are then broken at the start of the polymerization reaction.

The amount of catalytic base made, of neodymium and the amount of alkylating agent are expressed in μmol and in μMcm (μmol per 100 grams of monomer). Methanol (1 ml) or acetylacetone (used in excess) are used to stop the polymerization reactions. N-1,3-Dimethylbutyl-N'-phenyl-p-phenylenediamine (6PPD) and AO2246 are used as a protective agent for the polymer solutions obtained (at a weight of 0.2 g of each per 100 g of elastomer).

The polybutadienes are then extracted from the polymer solutions thus obtained, either by steam stripping in the presence of calcium tamolate and either drying on rolls at 100° C. or drying in an oven at 60° C. under vacuum with a slight stream of nitrogen, or by partial vacuum devolatilization with nitrogen purging at 50° C.

Control Test

Introduced successively into a Steinie bottle are 35 ml of methylcyclohexane solvent, 5.0 g of butadiene, 180 μmol of butyloctyl magnesium and one sealed glass ampoule containing 20 μmol of Nd(BH$_4$)$_3$(THF)$_3$.

The ampoule is broken under the effect of the mechanical stirring, then the reaction medium is heated to a temperature of 60° C. After 20 minutes, the polymerization reaction is stopped by addition of methanol, the polymer is coagulated, antioxidized then dried. Thus, 5.0 g of polybutadienes are obtained. The characterizations of this polymer are given in the table below.

Test 1

Introduced successively into a Steinie bottle are 35 ml of methylcyclohexane solvent, 5.2 g of butadiene and two sealed glass ampoules each containing 21 μmol of Nd(BH$_4$)$_3$(THF)$_3$ and 174 μmol of bis(ortho-N,N-dimethylaminobenzyl) magnesium.

The ampoules are broken under the effect of the mechanical stirring, then the reaction medium is heated to a temperature of 60° C. After 20 minutes, the polymerization reaction is stopped by addition of methanol, the polymer is coagulated, antioxidized then dried. Thus, 5.2 g of polybutadienes are obtained. The characterizations of this polymer are given in the table below.

Test 2

Introduced successively into a Steinie bottle are 70 ml of methylcyclohexane solvent, 7.8 g of butadiene and two sealed glass ampoules each containing 20 μmol of Nd(BH$_4$)$_3$(THF)$_3$ and 181 μmol of bis(ortho-N,N-dimethylaminobenzyl) magnesium.

The ampoules are broken under the effect of the mechanical stirring, then the reaction medium is heated to a temperature of 55° C. After 7 minutes, the polymerization reaction is stopped by addition of methanol, the polymer is coagulated, antioxidized then dried. Thus, 7.8 g of polybutadienes are obtained. The characterizations of this polymer are given in the table below.

Table of results

| ref | Nd(BH$_4$)$_3$(THF)$_3$ μmol (μMcm) | Co-catalyst Nature[a] | Co-catalyst μmol (μMcm) | Nd/Mg ratio | S/M | Conversion (time in min.) | Average activity kg/mol[Nd]/h | $M_n$ in g/mol[b] ($I_p$) | 1,2[c] | % 1,4-trans[c] | 1,4-cis[c] | % functionalized chains[d] |
|---|---|---|---|---|---|---|---|---|---|---|---|---|
| Control | 20 (400) | BOMAG | 180 | 9 | 5.4 | 100% (20) | 750 | 29 250 (1.33) | 46.1 | 29.4 | 24.5 | na[e] |
| Test 1 | 21 (404) | Mg(RN)$_2$ | 174 | 8.3 | 5.2 | 100% (20) | 780 | 27 500 (1.28) | 46.6 | 28.7 | 24.7 | 100% |
| Test 2 | 20 (256) | Mg(RN)$_2$ | 181 | 9.1 | 6.9 | 100% (7) | 3 343 | 30 000 (1.33) | 42.1 | 33.3 | 24.6 | 100% |

[a]BOMAG = butyloctyl magnesium; Mg(RN)2 = bis(ortho-N,N-dimethylaminobenzyl) magnesium
[b]$M_n$ and $I_p$ are determined by size exclusion chromatography (Annex 1)
[c]The microstructure is determined by a near infrared method (Annex 2)
[d]The proportion of chains functionalized by the dimethylaminobenzyl group is determined by $^1$H and $^{13}$C NMR (see Annex 3)
[e]na stands for "not applicable"

a) Principle of the Measurement:

Size exclusion chromatography (SEC) makes it possible to separate the macromolecules in solution, according to their size, through columns filled with a porous gel. The macromolecules are separated according to their hydrodynamic volume, the bulkiest being eluted first.

Without being an absolute method, SEC makes it possible to comprehend the molecular weight distribution of a polymer. From commercial calibration products, the various number-average molecular weights ($M_n$) and weight-average molecular weights ($M_w$) can be determined and the polydispersity index ($I_p = M_w/M_n$) can be calculated via a Moore calibration.

b) Polymer Preparation:

There is no particular treatment of the polymer sample before analysis. It is simply dissolved in (tetrahydrofuran+1 vol % of diisopropylamine+1 vol % of triethylamine+1 vol % of distilled water) to a concentration of around 1 g/l. Then the solution is filtered over a filter with a porosity of 0.45 μm before injection.

c) SEC Analysis:

The equipment used is a Waters Alliance chromatograph. The elution solvent is (tetrahydrofuran+1 vol % of diisopropylamine+1 vol % of triethylamine), the flow rate is 0.7 ml/min, the temperature of the system is 35° C. and the analysis time is 90 min. Use is made of a set of four Waters columns in series, having the trade names Styragel HMW7, Styragel HMW6E and two Styragel HT6E.

The injected volume of the solution of the polymer sample is 100 μl. The detector is a Waters 2410 differential refractometer and the operating software for the chromatographic data is the Waters Empower system.

The average molecular weights calculated are relative to a calibration curve produced for polybutadienes having the following microstructure: 11 wt % of 1,2-type units and 48 wt % of trans-1,4-type units.

The assaying technique known as "near infrared" (NIR) was used. This is an indirect method using "control" elastomers, the microstructure of which has been measured by the $^{13}C$ NMR technique. Use is made of the quantitative relationship (Beer-Lambert law) that exists between the distribution of the monomers in an elastomer and the shape of the NIR spectrum of this elastomer. This technique is carried out in two stages:

1) Calibration:

The respective spectra of the "control" elastomers are acquired.

A mathematical model is established that associates a microstructure with a given spectrum, this using the PLS (Partial Least Squares) regression method based on a factorial analysis of the spectral data. The following two documents deal in depth with the theory and the implementation of this "multivariate" data analysis method:

(1) P. GELADI and B. R. KOWALSKI
"Partial Least Squares regression: a tutorial",
Analytica Chimica Acta, vol. 185, 1-17 (1986).

(2) M. TENENHAUS "La régression PLS—Théorie et pratique" [PLS regression—Theory and Practice]
Paris, Editions Technip (1998).

2) Measurement:

The spectrum of the sample is recorded.

The microstructure is calculated.

The polymers are analysed by $^1H$ and $^{13}C$ NMR using a Bruker AV500 spectrometer equipped with a BBI $^1H$-X 5 mm probe. The solvent used for the analysis is a mixture of $CS_2$ and $C_6D_{12}$. The calibration is carried out starting from the protonated impurity of $CS_2$, with a chemical shift of 7.12 ppm.

The $^1H$ and $^2D$ NMR spectra confirm the presence of the dimethylaminobenzyl group at the chain end of the polybutadienes prepared. The chemical shifts of each type of proton have been attributed and information on them is given in the FIGURE:

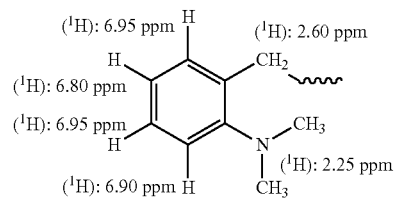

The quantification of the number of functional chains is carried out either from the signal of the aromatic proton at 6.80 ppm, which integrates for one proton, or from the broad peak between 2.7 and 2.3 ppm (—N(CH$_3$)$_2$ groups and CH$_2$ groups at the alpha position of the aromatic ring), which integrates for 8 protons. These values are related to the integration of the characteristic signals of the cis-1,4-, trans-1,4- and 1,2-units of polybutadiene. The two calculation methods result in values that are statistically identical to one another.

The invention claimed is:

1. A catalytic system for polymerization comprising:
   one rare-earth metal salt corresponding to the formula $Ln(A')_3(B)_n$, in which:
   Ln is chosen from lanthanides, yttrium, or scandium;
   A' is chosen from carboxylates, organophosphates, alcoholates, amides, alkyls or borohydrides;
   B is a solvent molecule complexed to the rare-earth metal; and
   n is an integer between 0 and 4; and
   one organometallic compound corresponding to the formula (I):

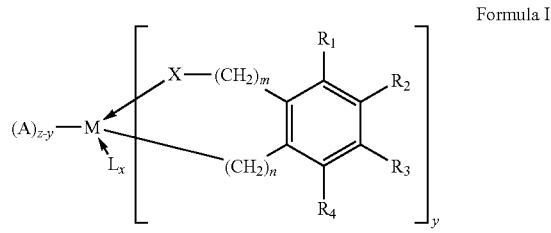

Formula I wherein: M is a metal belonging to the $2^{nd}$ or $13^{th}$ column of the Periodic Table;
$R_1$, $R_2$, $R_3$, $R_4$, which are identical to or different from one another, are hydrogen atoms or linear or branched alkyl or substituted or unsubstituted aryl substituents, optionally bonded together to form at least one ring composed of 5 or 6 atoms, or at least one aromatic ring;
A is an alkyl radical based on C, H or Si atoms;
X is a chemical function bonded by a heteroatom to (CH$_2$)$_m$ in the formula (I);
L is a Lewis base;
x is an integer that is equal to 0, 1, 2, 3 or 4;
n and m, independently of one another, are each an integer greater than or equal to 0, on condition that n and m are not both equal to 0;

z is equal to 2 when M belongs to the $2^{nd}$ column of the Periodic Table and is equal to 3 when M belongs to the $13^{th}$ column of the Periodic Table; and y is a non-zero integer ranging from 1 to z.

2. The catalytic system according to claim 1, wherein in the formula (I), X represents a group chosen from —OR or —NRR', with R, R' denoting linear or branched alkyl or substituted or unsubstituted aryl substituents that are identical to or different from one another.

3. The catalytic system according to claim 1, wherein in the formula (I), y is equal to 2 or 3.

4. The catalytic system according to claim 1, wherein the organometallic compound is chosen from those of formula (I) in which M denotes magnesium.

5. The catalytic system according to claim 1, wherein the organometallic compound is chosen from those of formula (I) in which M denotes aluminium.

6. The catalytic system according to claim 1, wherein in the formula (I), L denotes pyridine or THF.

7. The catalytic system according to claim 1, further comprising at least one agent chosen from alkylaluminums.

8. The catalytic system according to claim 1, further comprising a conjugated diene to preform the catalytic system.

9. The catalytic system according to claim 1, wherein the organometallic compound of formula (I) and the rare earth metal are present in amounts such that a (organometallic compound of formula (I)/rare-earth metal) molar ratio has a value ranging from 1.5 to 20.

10. The catalytic system according to claim 7, wherein the alkylaluminium agent and the rare earth metal are present in amounts such that a (alkylaluminium/rare-earth metal) molar ratio has a value ranging from 2 to 3.

11. The catalytic system according to claim 8, wherein the conjugated diene to preform the catalytic system and the rare earth metal are present in amounts such that a (conjugated diene/rare-earth metal) molar ratio has a value ranging from 10 to 70.

12. A process for preparing a catalytic system according to claim 1, comprising directly premixing in an inert hydrocarbon-based solvent, a rare-earth metal salt and the organometallic compound of formula (I), and optionally, an alkylaluminium agent.

13. The process for preparing a catalytic system according to claim 1, comprising forming the catalytic system in situ by reacting, in an inert hydrocarbon-based solvent, a rare-earth metal salt and the organometallic compound of formula (I), and optionally, an alkylaluminium agent.

14. The process for preparing a catalytic system according to claim 8, comprising preforming the catalytic system by introducing, in an inert hydrocarbon-based solvent, a rare-earth metal salt and the organometallic compound of formula (I), and optionally, an alkylaluminium agent, in the presence of a conjugated diene.

15. A process for preparing a chain-end functionalized diene elastomer, comprising a continuous or batch mode reaction of a catalytic system with at least one conjugated diene monomer to be polymerized, wherein said catalytic system is as defined in claim 1.

16. The catalytic system according to claim 7, wherein the alkylaluminum is selected from the group consisting of trialkylaluminum and dialkylaluminium hydrides, and alkylaluminum halides.

17. A functionalized diene elastomer, comprising a polar function at least one chain end, and represented by the formula (II):

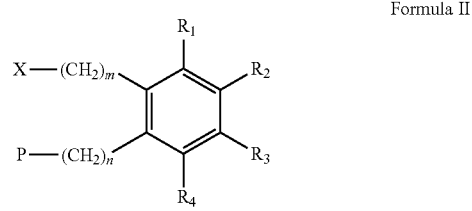

Formula II wherein
P represents diene elastomer that is a highly unsaturated diene elastomer selected from the group consisting of polybutadienes (BR) and synthetic polyisoprenes (IR);
$R_1$, $R_2$, $R_3$, and $R_4$, which are identical or different from one another, are hydrogen atoms or linear or branched alkyl or substituted or unsubstituted aryl substituents, optionally bonded together to form at least one ring composed of 5 or 6 atoms, or at least one aromatic ring;
m=0 and n is an integer greater than 0; and
X represents a group selected from the group consisting of —OR or —NRR', with R, R' denoting linear or branched alkyl or substituted or unsubstituted aryl substituents that are identical to or different from one another.

* * * * *